April 11, 1950
I. A. WEAVER
2,503,428
WHEEL ENGAGING ATTACHMENT FOR AXLE
ENGAGING VEHICLE LIFTS
Filed Nov. 13, 1945
5 Sheets-Sheet 4
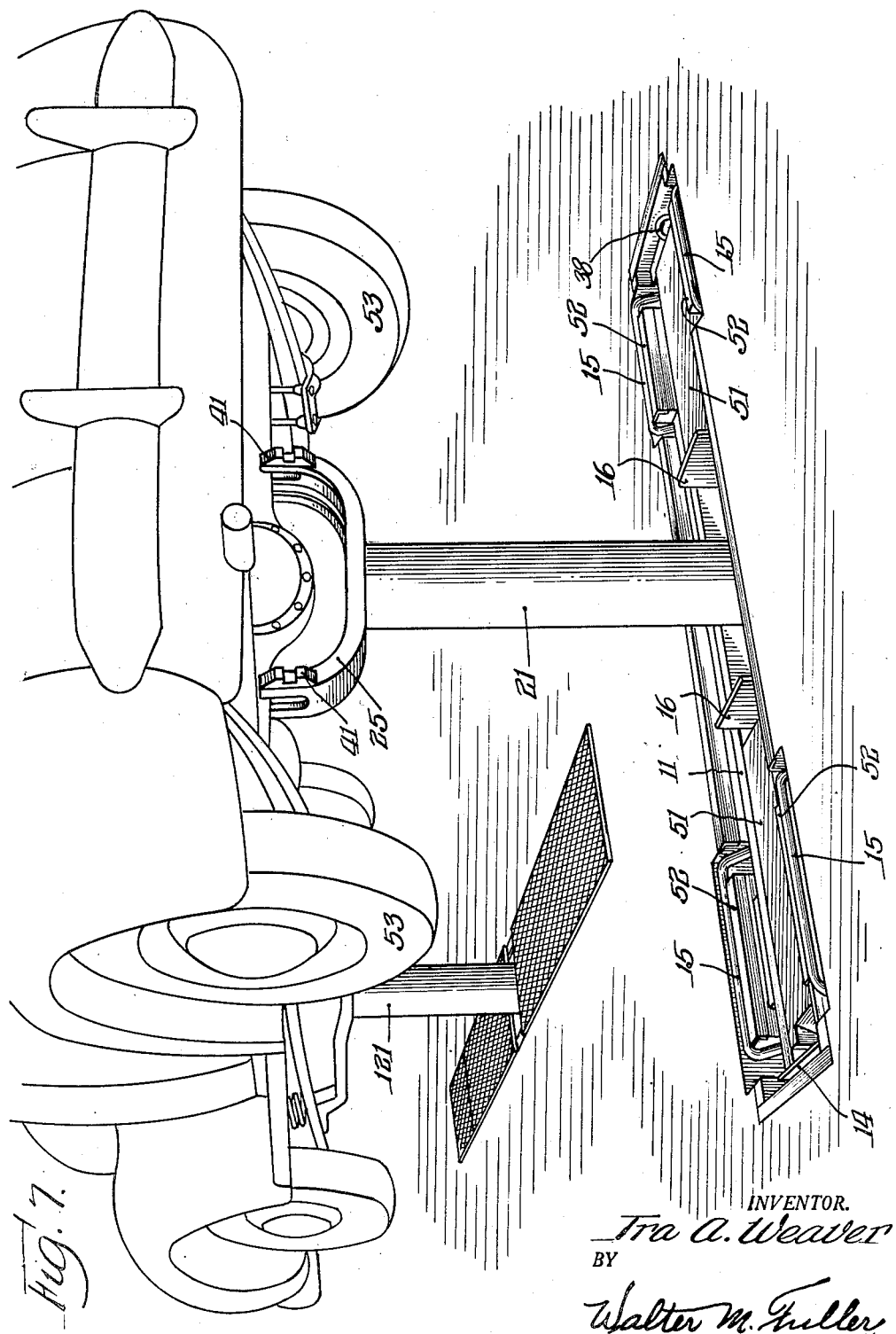
INVENTOR.
Ira A. Weaver
BY
Walter M. Fuller
Atty.

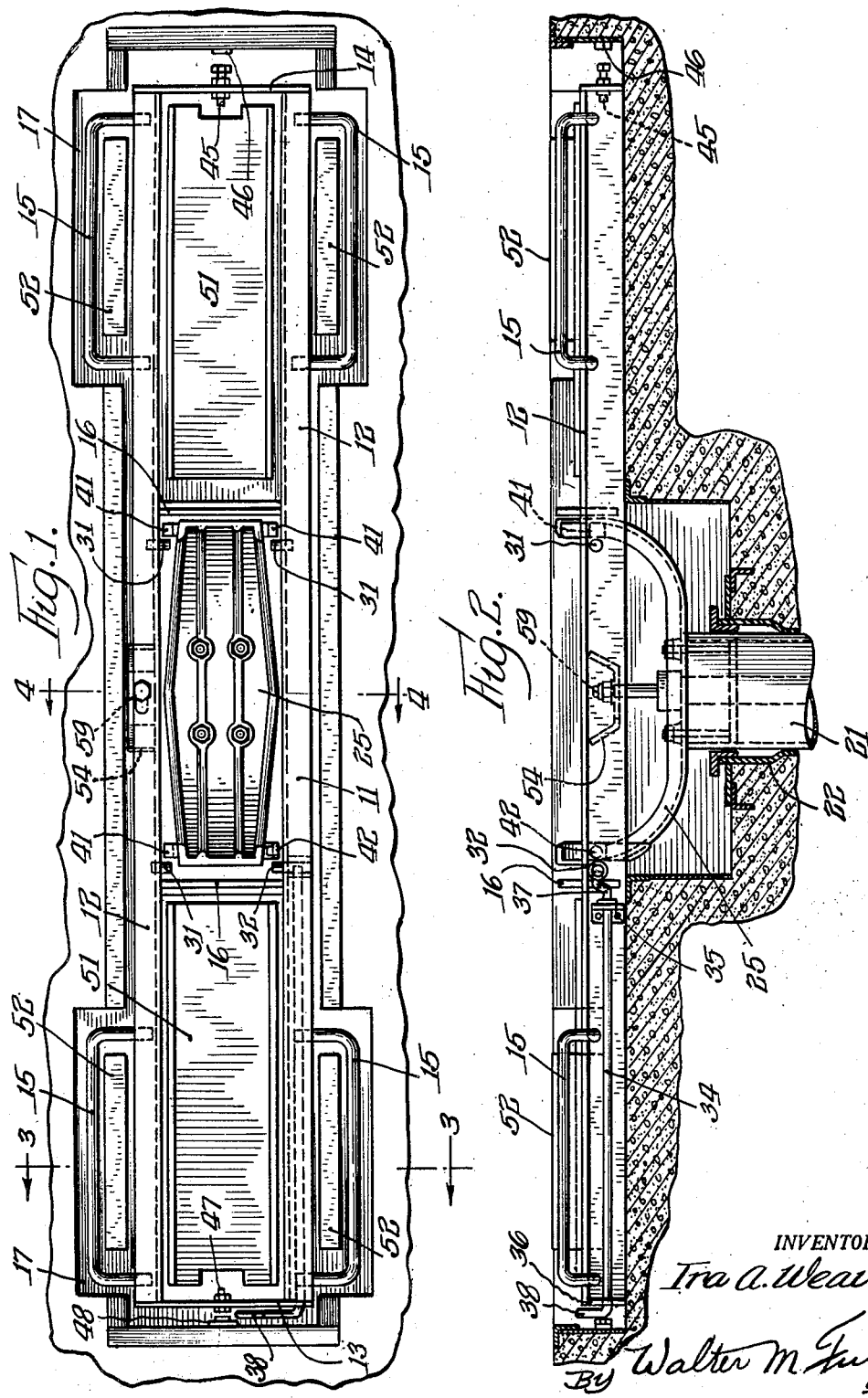

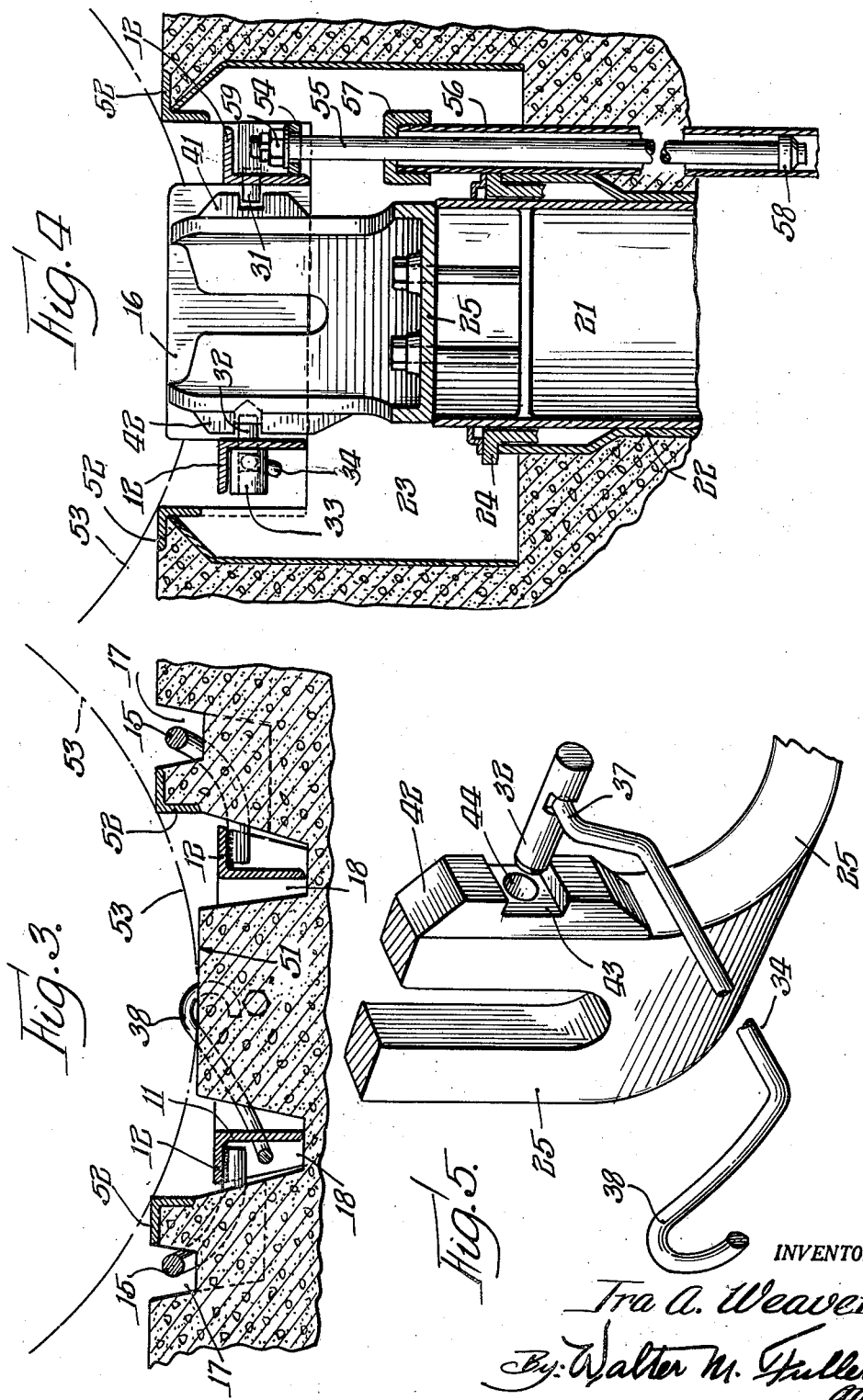

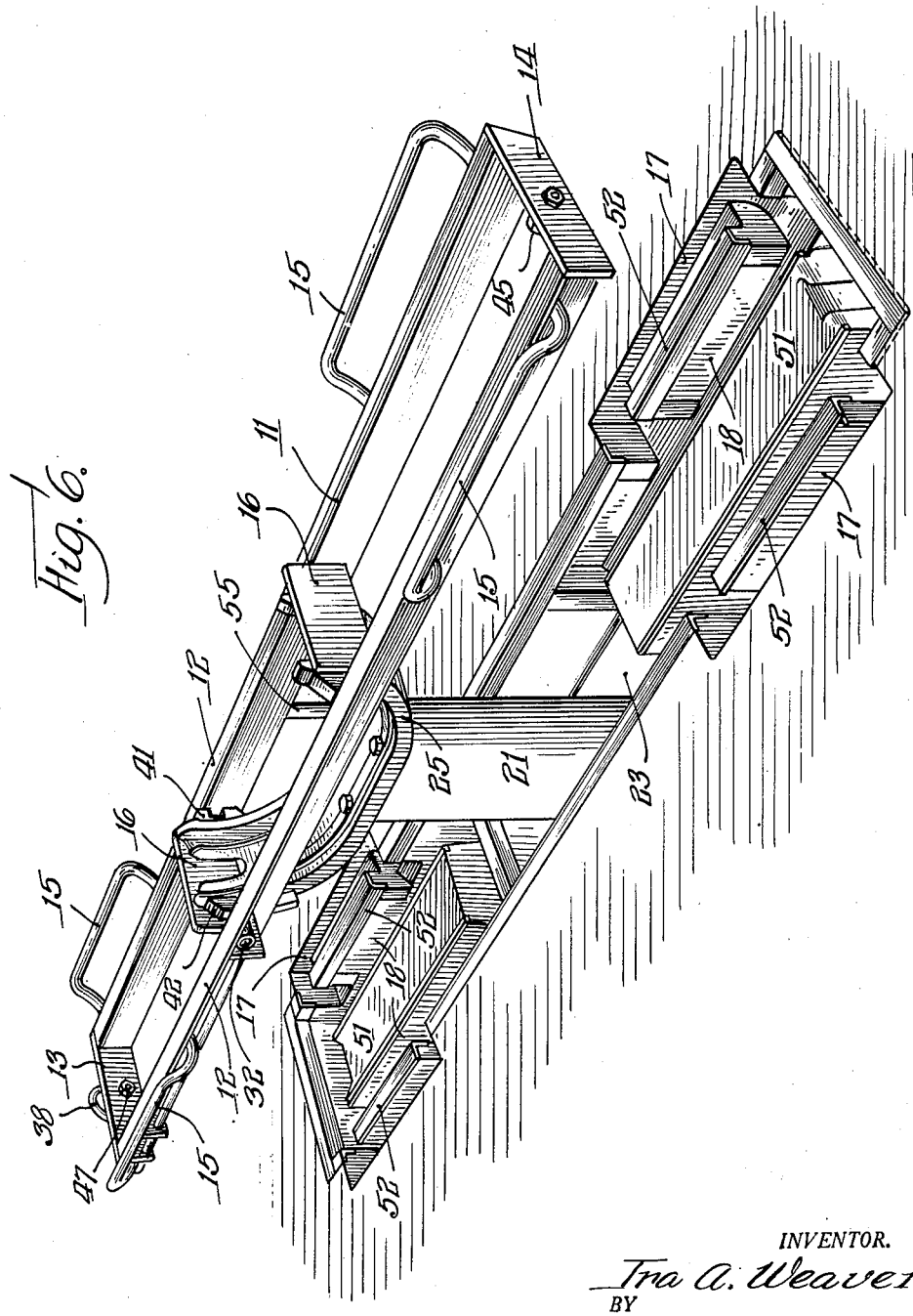

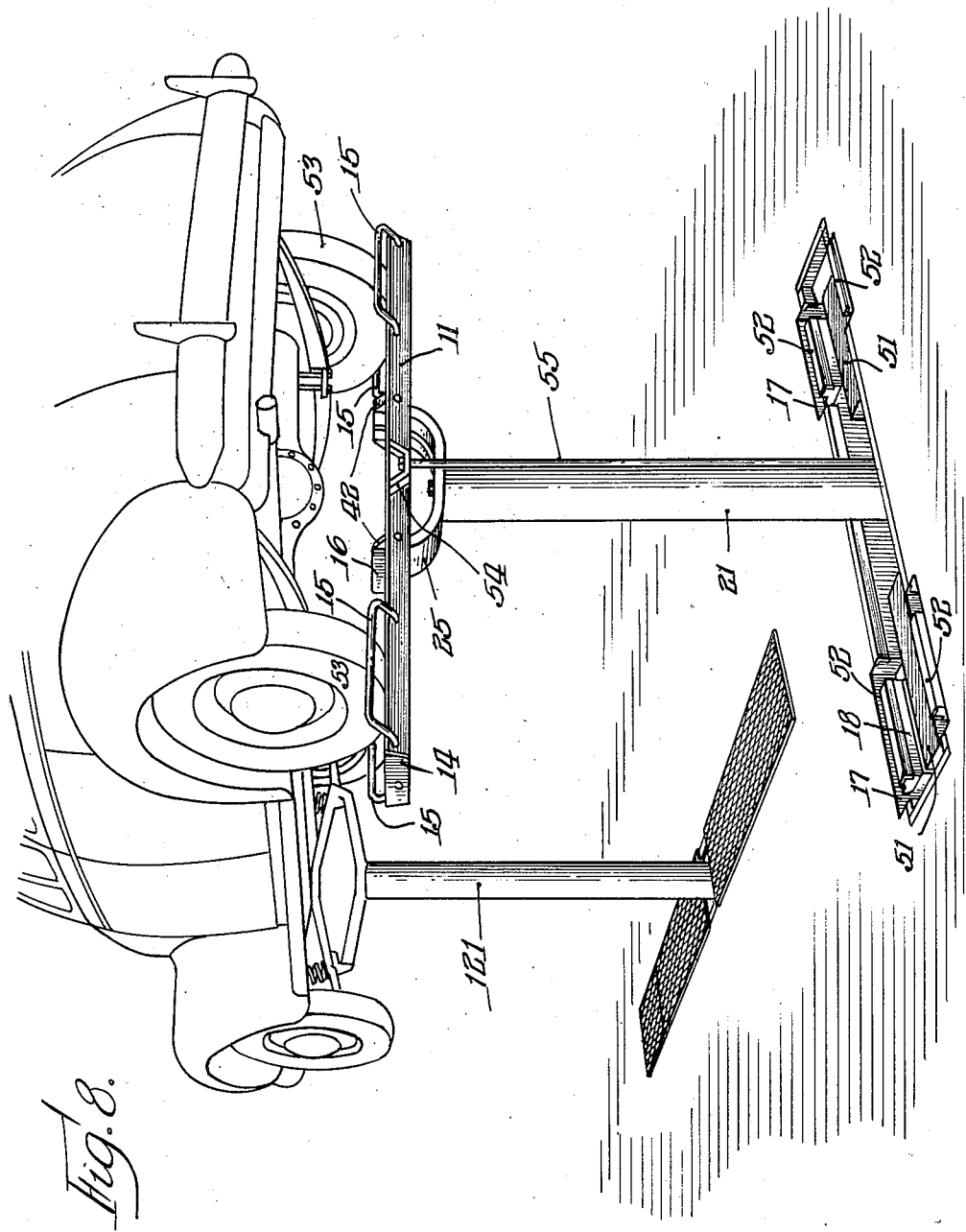

Patented Apr. 11, 1950

2,503,428

UNITED STATES PATENT OFFICE 2,503,428

WHEEL ENGAGING ATTACHMENT FOR AXLE ENGAGING VEHICLE LIFTS

Ira A. Weaver, Springfield, Ill., assignor to Weaver Engineering Co., a corporation of Illinois Application November 13, 1945, Serial No. 628,175

7 Claims. (Cl. 254—89)

One leading object and prime aim of this invention is to provide a suitable attachment for one of the posts of a dual-post vehicle-lift, whereby the vehicle may be elevated and lowered, either by its axle, which is the customary manner, or by its corresponding pair of wheels.

A further purpose or design of the invention is to supply an automatically acting stop so that when the vehicle is raised by a pair of its wheels, the power-operated, elevating post or plunger will stop at a lower height or position than when lifted by the axle, whereby to maintain the vehicle in a substantially level or horizontal position when fully raised.

In order that those acquainted with and skilled in this art may fully understand the new construction and its mode of operation, a present preferred embodiment of the invention has been illustrated in the several views of the drawings, forming a part of this specification, and to which reference should be had in connection with the following detailed description thereof, like reference numerals having been employed, for simplicity, throughout the several views of the drawings to designate the same elements or parts.

In these drawings—

Figure 1 is a plan view of the novel and improved attachment occupying its floor depression or chamber;

Figure 2 is a vertical elevation, partly in section, of Figure 1;

Figure 3 presents an enlarged cross-section on line 3—3 of Figure 1;

Figure 4 portrays an expanded cross-section on line 4—4 of Figure 1;

Figure 5 sets forth an amplified perspective view of the locking-means for the attachment (slotted socket 33 omitted for clarity);

Figure 6 depicts in perspective the new attachment mounted on the partially-raised rear post or plunger of a duplex-post lift;

Figure 7 shows an automobile partly elevated by engagement with its front and rear axles; and Figure 8 illustrates an automobile fully lifted by its front-axle and its rear-wheels.

By reference to these drawings, it will be noted that the new, supplemental attachment consists of a welded steel-frame, designating as a whole 11, adapted to receive and support either the front pair of wheels or the rear pair of wheels of a vehicle to be elevated and lowered, such appliance operating in a manner that one end of the vehicle may be lifted by its wheels.

This additive or auxiliary frame is composed of a pair of parallel angle-bars 12, 12 to the ends of which are welded terminal plates 13 and 14 to fixedly and firmly bind the longitudinal members together.

Near each end of such frame 11 a wheel-support or saddle is formed by two opposite, upwardly-flaring bent-rods 15, 15, of the shape illustrated, the ends of each of which are below, and welded to, the underside of the top, horizontal, outstanding flange of the corresponding bar 12 of the frame 11 as depicted, for example, in Figure 3.

Spaced apart equal distances from the middle of the length of frame 11 are a pair of metal strengthening plates 16, 16 between the two bars 12, 12 and extended above their top surfaces and welded at their ends to the inner faces of such frame-bars.

The floor, as shown perhaps more clearly in Figures 3 and 6, is provided with an elongated depression of the irregular conformation shown, including shallow portions 17, 17 receiving the wheel-seat parts 15, 15 and deeper inner sections 18, 18 designed to accommodate the portions of the main-frame 11 when the latter is in its lowermost position, as indicated in Figures 3 and 4.

The corresponding, vertical, power-actuated, hydraulic-plunger 21 reciprocates in an ordinary upright casing 22 embedded in the ground beneath a larger depression 23 below the floor-level at the central portion of the structure, the plunger or post extending upwardly out of the casing through a stuffing-box of appropriate form 24, and on the top end of the plunger or piston 21 is mounted a saddle 25 of the shape shown in the drawings and of such form as to properly engage and support the axle of the vehicle with which it is adapted to coact in the performance of its functions, such saddle in the depressed position of all parts occupying the space in the frame 11 between the elements 12, 12 and 16, 16 of the latter, as shown in Figure 6.

When the portion of the vehicle to be operated upon by this post or plunger 21 is the corresponding axle of the vehicle, then the attachment comprising the frame remains in the depression in the floor as shown in Figure 7, the other end of the car always being lifted by its axle.

When, however, the rear portion of the vehicle is to be raised by its wheels, instead of by its axle, then it is necessary to couple the frame 11 to the saddle 25, and the following means are provided for the accomplishment of that result.

Forming part of frame 11 are four inwardly-projecting pins 31, 31, 31 and 32 all on the same horizontal plane (Figs. 1, 2, 4 and 5), the three pins 31 occupying holes in, and welded to, the frame members 12, 12.

Pin 32, however, is movable endwise in a slotted socket-piece or bearing 33 welded to the outside of frame-member 12 with its bearing in alignment with a hole through such frame-member so that the pin 32 can be shifted in and out on the inside of the frame by the manual rocking of a rod 34, oscillatory in bearing members 35 and 36, one end of such rod having a bent end or crank 37 engaging a recess in the side of the pin 32, the other end of the rod having a readily accessible handle 38 by means of which the pin 32 may be shifted inwardly into operative position or outwardly into inoperative position.

Permanently attached to saddle 25 are four socket members 41, 41, 41 and 42, such three members 41, 41, 41 being slotted to receive the three pins 31, 31, 31 when frame 11 is shifted to the right slightly, as viewed in Figures 1 and 2.

Socket 42, however, is provided with a shallow slot 43 and a hole 44 adapted to receive pin 32, but before such pin 32 can be fitted or engaged in hole 44 the pin must be retracted by raising handle 38 after which frame 11 may be shifted to the right, as viewed, in Figures 1 and 2. When the frame is so moved to bring pin 32 into register with aperture 44, the handle 38 may be depressed which movement shifts pin 32 into hole 44 thus locking the frame in its mounting on the saddle 25, it being understood, of course, that as the frame is thus shifted to the right all three pins 31 enter the slots of their members 41 so that these parts may perform their portion of the lifting function.

In order that such pin 32 may be quickly and easily brought into register with its cooperating aperture 44 in socket 42 on the saddle 25, an adjustable stop-screw 45 in the frame end-plate 14 is provided, Figures 1 and 6, to engage a corresponding stop-plate 46 in the end of the floor depression.

At the left end of the frame another stop-screw 47 and stationary cooperating plate 48 are provided whereby when they engage it is certain that the pins 31 are free from their slotted brackets 41 and the pin 32 is free from its bracket 42.

When the frame is in the floor-depression, as illustrated in cross-section in Figure 3, the central surface 51 of the depression in register with each pair of seat-members 15, 15 combined with the stationary angle-bars 52, 52 constitute a chuck for the reception of the corresponding vehicle-wheel 53 to support the wheel above the frame-members 12, 12 and 15, 15.

As the wheel enters this chuck, thus resting on the depressed central portion of the floor 51, it is automatically centered over the frame 11 and its associated wheel-contact members 15, 15 and thus the frame is free to be shifted to the right or to the left as referred to above, because the vehicle does not then rest on it.

Near the center of the appliance, and on one side of the frame 11, as depicted in Figures 2, 4 and 8, is permanently attached an apertured bracket 54 through the slot of which extension there is an upright limit-rod 55 telescoping vertically into a pipe 56 securely set in the retaining cement, such pipe terminating at its upper end in a screwed-on cap 57 through which is drilled a hole large enough to accommodate the rod 55, the latter having at its lower end a securely-fastened head 58 larger in diameter than the rod 55 but freely slidable in the pipe or tube 56.

If the front and rear ends of a vehicle are lifted by its two axles, they may be elevated the same amount and the vehicle will be in a substantially level position fore and aft, but should one end of the vehicle be lifted by its axle and the other by the bottom or floor contact portion of its corresponding wheels, the lifting post under the latter end should raise a less amount than the other in order to maintain the vehicle in a practically level position. The post under the end which is lifted by the axle should raise eight or ten inches before contacting the axle and the post under the end which is raised by the wheels should rise but an inch or two before contacting or engaging the wheels. Hence, with the appliance under consideration, when lifting one end by the wheels, the nut 59 screwed on the upper end of rod 55 above the fixed bracket 54 may be adjusted on the rod so that when the head 58 contacts the cap 57 the post or plunger 21 will stop at the correct height for maintaining the vehicle practically level, when its companion plunger or post 121, elevating by the axle, has reached its normal limit of travel, as presented, for example, in Figure 8.

In operation, the vehicle to be elevated is driven on the lift until one pair of its wheels, usually the rear pair, are in the above-mentioned wheel-chucks 51, 52, 52 resting on the depressed central portion of the floor, as portrayed in Figure 4.

With the frame 11 shifted to the left (Figures 1 and 2) until the stop-screw 47 is in contact with its associated plate 48, the lifting post or plunger 21 is caused in the usual manner to rise by the regular hydraulic means causing saddle 25 to ascend until it contacts the vehicle-axle and then the corresponding end of the vehicle is elevated as will be readily understood.

On the other hand, frame 11 may be shifted to the right, Figures 1 and 2, first raising handle 38 and thus retracting pin 32, until stop-screw 45 contacts its stationary abutment plate 46 after which the handle 38 is released and it automatically falls by its own weight, which action causes the pin 32 to be inserted in hole 44 and thus lock the frame at its then position.

Of course pins 31, 31, 31 are at that time in their corresponding slots 41, 41, 41 in the saddle 25 so that when the post 21 is caused to rise frame 11 is correspondingly elevated whereupon the four contact members 15, 15, 15, 15 engage the pair of wheels and the rear end of the vehicle is elevated from the floor.

As will be readily appreciated, the limit-rod 55 rises in the pipe or tube 56 until its part 58 engages the cap 57 which halts or terminates the raising action of this post 21 but the companion post 121, Figure 8, at the opposite end of the vehicle, rises higher until its regular stopping means terminates such action. With the nut 59 properly adjusted, the vehicle will reach its limit of upward travel in a substantially level or horizontal position.

From what precedes it will be obvious that the slidable pin 32, when occupying the aperture 44, locks the frame in operative relation with the lifting saddle 25, and when the frame is in its inoperative, that is, non-lifting position, it is locked therein by the same pin overlapping the side of the bracket 42 so that there is no danger of the frame being in an intermediate dangerous position only partially coupled to the saddle.

Obviously, when the raised vehicle is lowered, as it nearly reaches its lowermost position, the under surfaces of the wheel-tires engage the chucks and become supported thereby being partially lifted from their seats, so that they are no longer supported by the frame, which, when manually unlocked, may be shifted to the left and thus uncoupled from the saddle in which relation it will be locked by the lowering of the handle 38.

The vehicle may be driven off of the lift from the chucks either before or after the frame is shifted to the left into its inoperative position.

Those acquainted with this art will readily comprehend that this invention is not necessarily limited and restricted to the precise and exact details of structure illustrated and described, and that reasonable modifications may be resorted to without departure from the heart and essence of the invention, as defined by the appended claims, and without the loss or sacrifice of any of its material benefits and advantages.

I claim:

1. In a vehicle lift, a pair of front and rear mutually independent lift plungers, each plunger being provided with an axle engaging saddle, one of the plungers being provided with wheel engaging lifting means associated with its saddle, means for detachably connecting said wheel engaging lifting means and said saddle whereby either lifting device may be employed, and means for selectively limiting elevation of said one plunger when the wheel engaging means is employed.

2. In a vehicle lift, a pair of front and rear mutually independent lift plungers, an axle engaging saddle carried by each plunger and extending at diametrically opposite sides thereof in a vertical plane of the plunger, wheel engaging lifting means extending at diametrically opposite sides of one of the plungers and connected to the saddle thereof when said wheel engaging lifting means is in use, said wheel engaging lifting means being free of said saddle and said plunger when said lifting means is not in use, means other than said saddle and said plunger for supporting the wheel lifting means when said wheel lifting means is not in use, and lever actuated means for connecting together the two lifting means, said lever actuated connecting means being operable both for connecting and disconnecting the two lifting means when the wheel lifting means is being supported by the supporting means, whereby either lifting means may be employed.

3. In a vehicle lift, a pair of front and rear mutually independent lift plungers each provided with an axle engaging saddle, wheel engaging lifting means associated with one of the plungers, means co-acting with said wheel engaging means to selectively limit elevation of the plunger thereof when said wheel engaging means is employed.

4. For association with a vehicle lift having a lifting plunger and an axle engaging saddle mounted on the plunger, a novel attachment incorporating the combination of a wheel engaging lifting frame free from the saddle and plunger when the plunger is at its low limit and the frame is not in use for lifting purposes and of a size and shape to engage and support a pair of vehicle wheels, the axle engaging portion of the saddle and the wheel engaging portion of the frame lying in the same vertical plane with the plunger, a manually controlled mechanical means operable both to couple said frame to and uncouple it from said saddle when the plunger is at its low limit and the frame is not in use whereby the frame may be selectively elevated by said saddle and lift the vehicle wheels or remain unelevated by the saddle when the latter ascends and performs its axle lifting function, and automatic means to limit the elevation of said vehicle wheels by said coupled attachment a lesser distance than said axle by said saddle operating singly.

5. For association with a vehicle lift having a lifting plunger and an axle engaging saddle mounted on the plunger, a novel attachment incorporating the combination of a wheel engaging lifting frame free from the saddle and plunger when the plunger is at its low limit and the frame is not in use for lifting purposes and of a size and shape to engage and support a pair of vehicle wheels, the axle engaging portion of the saddle and the wheel engaging portion of the frame lying in the same vertical plane with the plunger, and a manually controlled mechanical means operable both to couple said frame to and uncouple it from said saddle when the plunger is at its low limit and the frame is not in use whereby the frame may be selectively elevated by said saddle and lift the vehicle wheels or remain unelevated by the saddle when the latter ascends and performs its axle lifting function, said frame being movable endwise and provided with coupling means rendered operative and inoperative by longitudinally moving the movably mounted frame relative to the saddle transversely of the vehicle.

6. For association with a vehicle lift having a lifting plunger and an axle engaging saddle mounted on the plunger, a novel attachment incorporating the combination of a wheel engaging lifting frame free from the saddle and plunger when the plunger is at its low limit and the frame is not in use for lifting purposes and of a size and shape to engage and support a pair of vehicle wheels, the axle engaging portion of the saddle and the wheel engaging portion of the frame lying in the same vertical plane with the plunger, and a manually controlled mechanical means operable both to couple said frame to and uncouple it from said saddle when the plunger is at its low limit and the frame is not in use whereby the frame may be selectively elevated by said saddle and lift the vehicle wheels or remain unelevated by the saddle when the latter ascends and performs its axle lifting function, said frame being movable endwise and provided with coupling means rendered operative and inoperative by longitudinal movement of the frame relative to the saddle and including means to actuate said coupling means to lock said frame to the saddle when thus coupled together and operative to actuate said coupling means to permit uncoupling of the frame from the saddle.

7. For association with a vehicle lift having a lifting plunger and an axle engaging saddle mounted on the plunger, a novel attachment incorporating the combination of a wheel engaging lifting frame free from the saddle and plunger when the plunger is at its low limit and the frame is not in use for lifting purposes and of a size and shape to engage and support a pair of vehicle wheels, the axle engaging portion of the saddle and the wheel engaging portion of the frame lying in the same vertical plane with the plunger, and a manually controlled mechanical means operable both to couple said frame to and uncouple it from said saddle when the plunger is at its low limit and the frame is not in use whereby the frame may be selectively elevated by said saddle and lift the vehicle wheels or remain unelevated by the saddle when the latter ascends and performs its axle lifting function, said frame being movable endwise and provided with coupling means rendered operative and inoperative by longitudinal movement of the frame relative to the saddle, and including means to releasably lock the frame to the saddle while coupled together or in inoperative position while uncoupled from the saddle.

IRA A. WEAVER.

REFERENCES CITED

The following references are of record in the file of this patent:

UNITED STATES PATENTS

| Number | Name | Date |
|---|---|---|
| 1,869,283 | Stukenborg | July 26, 1932 |
| 1,942,276 | Clapp | Jan. 2, 1934 |
| 2,015,357 | Weaver | Sept. 24, 1935 |
| 2,037,531 | Moore | Apr. 14, 1936 |
| 2,100,617 | Thompson | Nov. 30, 1937 |
| 2,112,481 | Cox | Mar. 29, 1938 |
| 2,282,621 | Thompson | May 12, 1942 |

FOREIGN PATENTS

| Number | Country | Date |
|---|---|---|
| 800,630 | France | July 15, 1936 |